Jan. 17, 1967 E. C. CHERRY ET AL 3,299,204

TELEVISION AND LIKE DATA TRANSMISSION SYSTEMS

Filed June 26, 1963 7 Sheets-Sheet 3

TELEVISION AND LIKE DATA TRANSMISSION SYSTEMS 3,299,204

TELEVISION AND LIKE DATA TRANSMISSION SYSTEMS

Edward Colin Cherry, Shere, Surrey, and Donald Edwin Pearson and Marcus Paul Barton, London, England, Muthanna Hussain Kubba, Baghdad, Iraq, and Herbert Bernhardt Voelcker, Rochester, N.Y., assignors to National Research Development Corporation Filed June 26, 1963, Ser. No. 290,863
16 Claims. (Cl. 178—6)

This invention relates to television systems in particular and to data transmission systems generally.

It is a characteristic of data transmission systems that the signal transmitted from the transmitter to the receiver of the system has periods of high information content and other periods of low information content. The corresponding electrical signal has a wide frequency, short-term, bandwidth during the periods of high information content and a narrow frequency, short-term, bandwidth during the periods of low information content.

Conventional systems employ a wide-bandwidth transmission channel, the necessary bandwidth of which is determined by the bandwidth of the signal during periods of high information content. Usually the choice has to be a compromise, so that although the signal bandwidth is accommodated during periods of high information content, it is not accommodated during periods of maximum information content.

In a conventional television system, the video signal bandwidth, during periods of maximum signal detail may extend considerably above 3 mc./s. The transmission channel may, nevertheless, be limited to 3 ms./s band width, or to such comparable figure as it is decided gives the viewer a subjectively acceptable amount of detail in the viewed picture.

In such systems, periods of high information content form a small proportion of the total signal transmission time. Thus, the available bandwidth of the transmission channel is made use of for only a small proportion of the transmission time. Such a system is clearly uneconomic.

Various systems have been proposed for modifying the original signal, so that the information content thereof is more uniformly distributed in time. In this way, the bandwidth of the transmission channel can be reduced. Alternatively, keeping the conventional wide-bandwidth transmission channel, more information can be transmitted in unit time.

The object of the present invention is to provide an improved system of this form.

In common with the earlier systems proposed, the present invention has its most valuable application, at the present time, to television systems. Consequently, it is most convenient to describe the invention as a television system. However, it will be understood that it may be applied also to other data transmission systems, such as picture facsimile and multiplex telephony and telegraphy systems.

A television picture is characterised by areas of uniform brightness, that is low picture detail, and other areas of rapid transitions of brightness, that is high picture detail. Scanning of low-detail areas provides a signal of low information content and narrow, short-term, bandwidth; scanning of high-detail areas provides a signal of high information content and wide, short-term, bandwidth. The former signal will be referred to herein as a low-detail signal and the latter as a high-detail signal.

The present invention provides a television or other data transmission system having a transmitter and a receiver connected by a transmission channel of insufficient bandwith to accommodate the bandwidth of high-detail signals, the transmitter having a scanner for translating a television picture into a corresponding picture signal, a detail detector unit for estimating the detail content of the picture signal continuously according to one of a plurality of discrete picture detail levels and for providing a corresponding picture detail level signal, an analogue-to-digital converter supplied with the picture signal and controlled by the picture detail level signal to provide digital evalution of picture signal amplitude at discrete sampling instants, the sampling instants being spaced by a chosen one of a plurality of predetermined sampling intervals defining a plurality of different signal sampling rates, the choice of sampling rate being determined by the picture detail level signal, a first multiple-stage store for storing the digital samples of picture signal amplitude, means for extracting from the first store said digital samples at a predetermined extraction rate, means for supplying said samples to said transmission channel, either in digital form or after reconversion to analogue, that is amplitude, form, a storage content unit for continuously examining the number of the digital samples contained in said first store and providing an overload and an underload signal respectively as the first store becomes full or becomes empty, said overload and underload signals being effective to override said choice of signal sampling rate and to choose a signal sampling rate less than the sample extraction rate in the case of the overload signal and a signal sampling rate greater than the sample extraction rate in the case of the underload signal, a sample-rate coder for providing digital numbers defining the interval between successive picture signal samples, a second multiple stage store for storing the sample-rate numbers, means for extracting from the second store said sample-rate numbers at the said predetermined extraction rate and coincidently with one of the two picture signal samples to which it relates and means for supplying said sample-rate numbers to said transmission channel, either in digital or analogue form and said receiver being supplied both with a picture signal derived from said picture signal samples and a scanning position signal derived from said sample-rate numbers.

In order that the invention may be clearly understood, two embodiments thereof, which are both black-and-white television systems, will now be described in detail, by way of example, with reference to the accompanying drawings, in which:

FIG. 1 is a block schematic diagram showing the general arrangement of both embodiments;

FIGS. 2*a* to 2*f* are a series of amplitude/time waveform diagrams representing the signals appearing at the points (*a*) to (*f*) respectively of FIG. 3;

Figure 1:
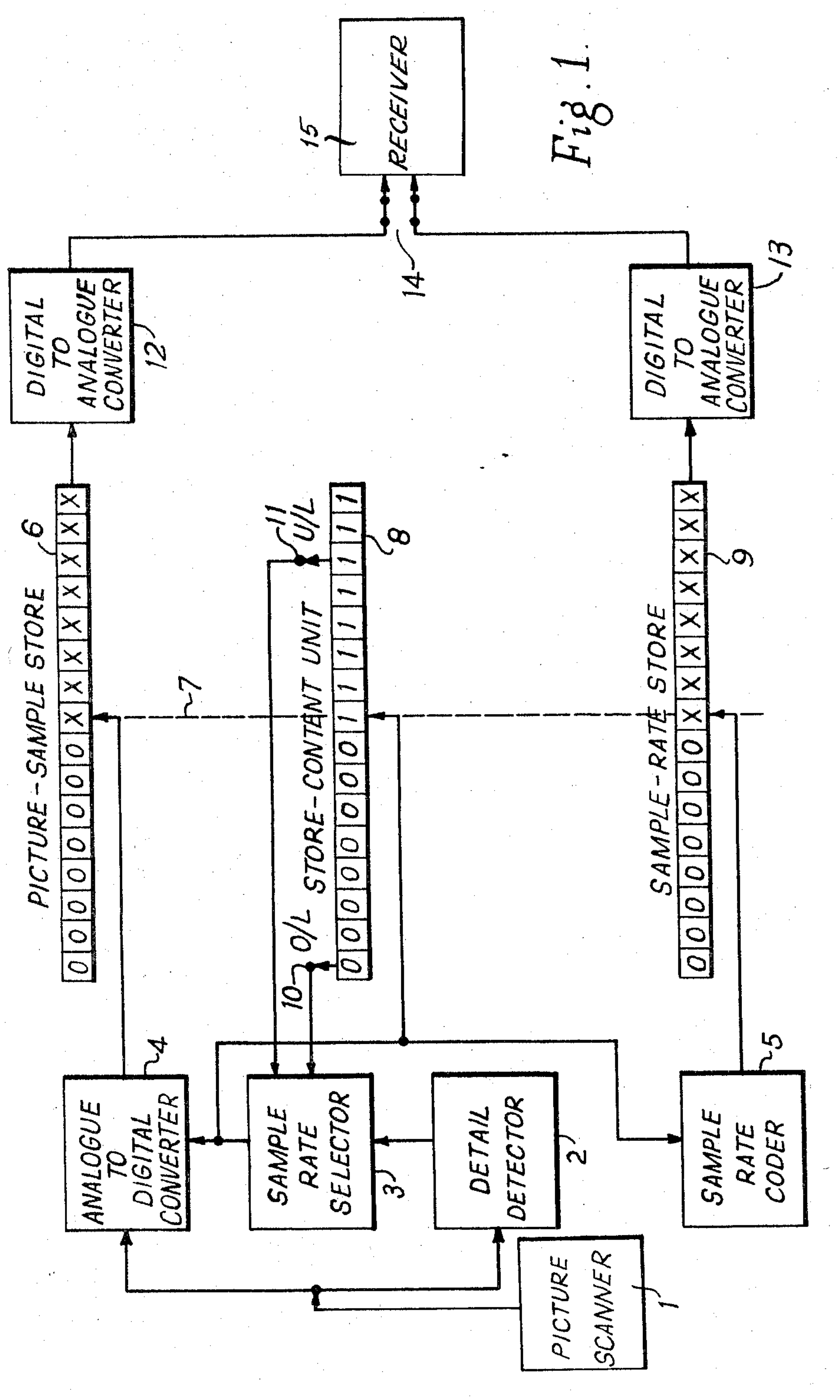
Figure 10:
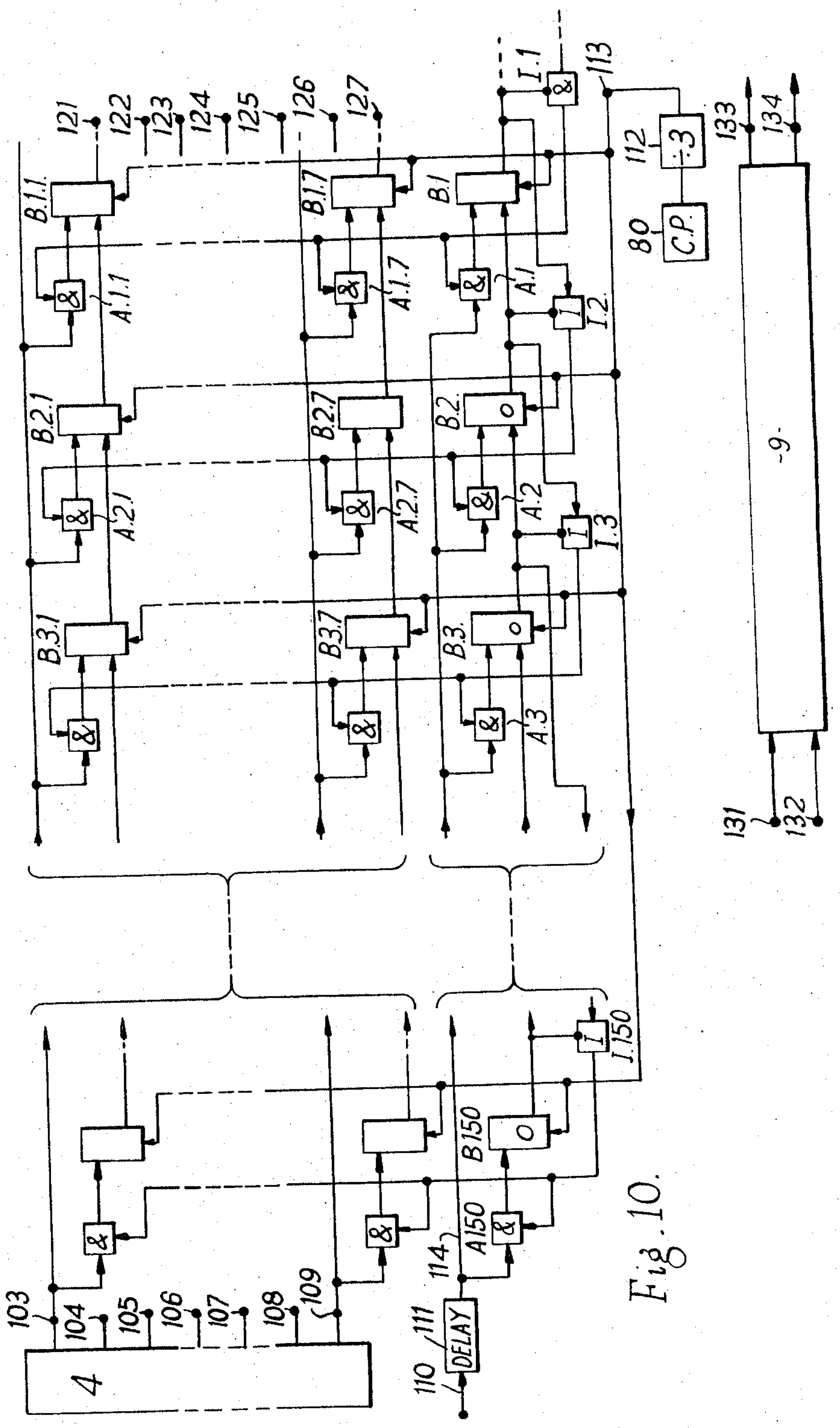

FIG. 10 is a block schematic diagram of the picture-sample store 6, switch 7, store-content unit 8 and sample-rate store 9 of FIG. 1.

FIG. 1 is a greatly-simplified schematic diagram which shows the essential features of the present invention as applied to a television system.

A picture-scanner 1, of conventional form, scans the picture to be transmitted and provides a picture signal of conventional form, that is a voltage signal varying continuously in amplitude according to brightness of the picture-elements scanned. This continuously-varying signal is called an analogue signal.

During periods when picture areas of low-detail are being scanned, the resultant low-detail signals have a small, short-term bandwidth. For picture areas of high detail, the corresponding high-detail signal from a conventional scanner may be of several megacycles bandwidth. For the purpose of the embodiments herein, it is assumed that the picture signal from scanner 1 is limited, by low-pass filter or otherwise, to 3 mc./s. bandwidth.

The picture signal is fed from scanner 1 to a detail detector 2 and to a combined sampler and analogue-to-digital converter 4.

The detail detector 2 continuously examines the picture signal waveform and provides an output signal whenever a significant change of picture signal amplitude is detected. Such change will of course occur with every rapid transition of pitcure brightness, that is with every element of detail.

To this end, the detail detector 2 includes a tapped delay line into which the picture is contitnuously fed. The delay line taps correspond to instants of time spaced apart by the intervening delay intervals. Thus, the picture signal amplitude is continuously examined at spaced intervals of time by simultaneously comparing the signals appearing at the different delay line taps. By this means, significant changes of picture signal amplitude are detected. The detail detector 2 is described more fully below.

The detail detector output signal is fed to a sample-rate selector 3, the function of which unit is to modify the instructions from the detail detector so that signal samples are taken only at one of a number of predetermined signal sample rates.

It is known from theoretical considerations that all the information in a signal of N mc./s. bandwidth can be provided by pulses having a pulse repetition frequency of $2N.10^6$ per second, that is, by pulses spaced by intervals of ½N microsecond, each pulse having the instantaneous amplitude of the original signal. The interval of ½N microsecond is known as the Nyquist interval.

In the present example, the picture signal band-width is limited to 3 mc./s. Thus, if the picture signal is pulse code modulated at 6 mc./s., that is replaced by pulses of equivalent amplitude and of pulse repetition frequency $6.10^6$ per second, no picture detail is lost during periods of the highest picture detail the picture signal can represent.

The pulse frequency of $6.10^6$ per second, that is a pulse interval of ⅙ microsecond, is thus chosen as the highest signal sampling rate for the sample rate selector 3.

A small number of successively slower pulse rates are provided, for choice by the sample rate selector when the picture detail is correspondingly lower. In the present system, two alternative sample rates are provided, respectively, of ⅓ and ⅑ the maximum rate, corresponding to pulse intervals ½ microsecond and 1½ microseconds, respectively.

The detail detector 2 continuously examines the picture signal and identifies periods of high-detail and low-detail therein. Correspondingly, the detail detector 2 supplies a two-level output signal.

From the high or low detail information supplied by the detail detector 2, the sample-rate selector 3 determines the picture signal sampling rate required.

For the high-detail condition, the highest sampling rate is chosen, corresponding to the sampling intervals of ⅙ microsecond. For the low-detail condition, a lower sampling rate is chosen.

The function of the sample-rate selector 3 is to limit the many possible resultant sampling rates to the three rates chosen for the system, that is, the high-detail rate at intervals $t$ of ⅙ microsecond, the medium rate at intervals of $3t$ and the slow rate at intervals of $9t$. The sample-rate selector 3 supplies an output control pulse as and when a signal sample is required.

The control pulses from the sample rate selector are fed to the sampler/converter 4. This unit performs two functions. The picture signal is fed continuously to the sampler/converter 4, and each time a control pulse is supplied thereto, this unit evaluates the instantaneous amplitude of the picture signal according to a finite number of discrete levels.

In the system described more fully below, $2^7$—128 levels are chosen. The signal amplitude information is supplied in digital form and it will readily be seen that this information can be indicated by seven binary elements. In other words, the picture signal amplitude is identified by a number having seven binary characters, these 7-bit numbers being supplied at the pulse sample rate. Accordingly, they are correctly described as digital picture samples.

The output control pulses from the sample rate selector 3 are also supplied to a sample-rate coder 5. As has been stated above, three sample-rates are possible. The three possible pulse intervals can thus be identified by two binary elements, in other words by a number of two binary digits. Indeed, only two binary digits would be needed for a system with four possible pulse-rates.

The sample rate coder provides an output number of two binary digits identifying the interval between consecutive control pulses, that is between consecutive digital picture samples.

It will now be understood that the full information content of the 3 mc./s. picture signal is contained in a succession of unequally spaced picture samples, most of which are spaced by more than the Nyquist interval corresponding to 3 mc./s. bandwidth. Thus, this information can be transmitted by a channel of less than 3 mc./s., provided that the samples are transmitted more uniformly in time than they are generated. The function of the remaining units of the transmitter of the system is to perform such rearrangement in time.

To this end, the digital picture samples are entered into a picture-sample store 6 as they are produced and are accumulated or "stacked" in the store until required for transmission. Thus, picture samples are entered into the store 6 at one of the three rates chosen by the sample rate selector 3, as determined by the picture detail, and the samples are extracted from store 6 at a uniform rate for transmission.

Ideally, the extraction rate is the average rate of picture signal sampling over a long period, and the bandwidth of the transmission channel used is determined by this average sampling and sample-extraction rate.

In the practical system described herein, the sample extraction rate is chosen to be the same as the medium picture detail sampling rate, that is a pulse rate of $2.10^6$ per second, the extraction interval then being ½ microsecond.

As will be understood from the fuller description which follows, this enables a single clock-pulse generator to be used for control of both sampling and sample-extraction and otherwise simplifies the storage operation.

The picture-sample store 6 comprises seven parallel channels, to store the digital number of seven binary digits. Each channel has a large number, over one hundred, stages, so that the store has a capacity of over one hundred picture samples at any one time. This capacity is required during periods when picture detail is high and the picture sampling rate exceeds the sample extraction rate. The store 6 thus acts as a reservoir of picture samples.

The store 6 is arranged so that successive picture samples are extracted from one end of the store. As the end store stage is left empty, the numbers in the store are moved forward by one stage to refill the emptied last stage. Each new picture sample is entered into the first available, that is unoccupied, stage of the store.

The arrangement is shown in FIG. 1 where the picture store 6 is shown with sixteen stages. The stages holding a 7-bit number are marked "X." The empty stages are marked "0." The first empty stage is selected by a switch 7. The figure shows the condition immediately after a picture sample has been entered. The position of switch 7 moves to the left preparatory for the next following picture sample and is moved to the right as each sample is extracted.

So that the original picture signal can be reconstructed in the receiver 15, each picture sample is identified according to its spacing, as determined by the sample-rate selector 3.

It is immaterial whether the spacing is measured from the preceding picture pulse or the next following picture pulse, so long as the system is consistent. In the system described below, the interval is measured from the preceding pulse. This information is coded by the sample-rate coder 5, stored as a 2-bit number in a sample-rate store 9, advanced through the store with the corresponding picture sample and extracted from store and transmitted with it. Thus, store 9 has the same number of stages as store 6, stored numbers are advanced stage by stage correspondingly and switch 7 similarly selects the first empty stage of both stores. The stages of store 9 which hold a 2-bit sample-rate number are similarly marked "X." Empty stages are marked "0."

It is a feature of the system that a picture sample is made available for transmission at every extraction operation from store. During periods of low picture detail, when the picture sample rate is less than the sample extraction rate, the stores 6 and 9 tend to empty. To prevent this ever happening, extra picture samples are generated and entered into store.

The contents of stores 6 and 9 are continuously measured by a store-content unit 8. This unit is a third store having the same number of stages as stores 6 and 9. Each store stage has only two conditions, viz. "full" or "empty." This information is shown by a single binary element for each store stage of the store-content unit 8 and the stages are selected by the same switch 7. Full store stages are marked "1" and empty stages marked "0" in FIG. 1.

When the stores 6 and 9 near the empty condition, a stage near the end of unit 8 changes from "1" to "0." This change generates an "Underload" signal at terminal 11, which signal is fed to sample rate selector 3 to override the sample rate instruction determined by low picture detail and instead provide the medium sampling rate. Samples then continue to be generated at the sample extraction rate, no matter how low the picture detail.

Conversely, during periods of high picture detail, the picture sample rate exceeds the sample extraction rate and the stores 6 and 9 tend to fill up. Store saturation can be delayed by increasing the store capacity, but this course has obvious limits.

In the system described below, the stores 6 and 9 have 150 stages and the store-content unit 8 indicates when this capacity becomes saturated. When stores 6 and 9 become full, the first stage of unit 8 changes from "0" to "1." This change provides an "Overload" signal at terminal 10. This signal is fed to the sample rate selector 3 to override the high sample rate instruction provided by the high picture detail in favour of the medium sample rate. Thereafter, picture samples are taken at the sample extraction rate, no matter how high the picture detail.

With a statistically probable alternation of high, medium and low-detail areas as the picture is scanned, the stores 6 and 9 operate as a true reservoir in the middle region of their capacity, additional samples of low-detail not being required and omitted samples of high-detail not being necessary.

While it would be possible to transmit the picture samples and sample rate numbers in digital form, as for example by a transmission channel having nine parallel channels, it is preferred to transmit both signals as analogue signals. Accordingly digital-to-analogue converters 12 and 13 are provided for the picture samples and sample rate information respectively.

The two signals are transmitted by two channels separated physically or separated in radio frequency or in time, as preferred. The necessary techniques are well-known and need not be described. The two channels, which together form transmission channel 14, are referred to herein as the video channel and the position information channel, respectively.

Thus, the output signals from the converters 12 and 13 are fed to a transmission channel 14 of known form. The capacity of channel 14 is fully used by the uniformly transmitted information. This bandwidth of channel 14 is determined by the picture sample extraction rate and by the combined information content of the picture and sample supply rate signals, that is 9-bits.

If solely the picture samples needed to be transmitted, the bandwidth of channel 14 would be ⅓ that of a conventional channel used to transmit the original 3 mc./s. picture signal.

As the read-out or sample-rate numbers and the read-out rate of picture samples is the same, the video and position channels may require the same bandwidth. As the sample rate number represents less data than the picture sample, this position information signal may be recoded, to occupy a correspondingly smaller bandwidth, using multiple-level amplitude modulating encoding. The unit for such recoding is not shown in the simplified diagram of FIG. 1.

Both signals are fed by channel 14 to receiver 15. The receiver 15 receives both picture samples and sample supply rate information at the uniform rate at which it is transmitted. It re-spaces the samples according to the sample supply rate information and thereby reconstructs the original 3 mc./s. analogue signal. This signal is used to provide a picture to the viewer by known techniques.

Additionally, picture frame and line synchronising information must be transmitted to the receiver and at least one sound channel provided. These again follow well-established techniques and the present invention is not concerned with the form taken by these parts of an overall television system.

Having outlined the general form and manner of operation of a television transmission system according to the invention, the individual units of the system will now be described more fully.

*Picture scanner*

The picture scanner 1 may be of conventional form, such as a camera tube or film scanner. The line number and frame frequency standard is immaterial to the system, except that it is assumed that the instantaneous bandwidth of the picture signal is limited to 3 mc./s., for example by a low-pass filter, and that adequate definition for the system is provided in this bandwidth. The figure of 3 mc./s. is assumed for convenience of the following description and corresponds to the figure which applies to the British 405 line television system.

Line and frame synchronising information are derived from the scanning circuits associated with the picture scanner, so that the receiver picture tube can be synchronised in the conventional manner.

Figures 2A, 2B, 2C, 2D, 2E, 2F:
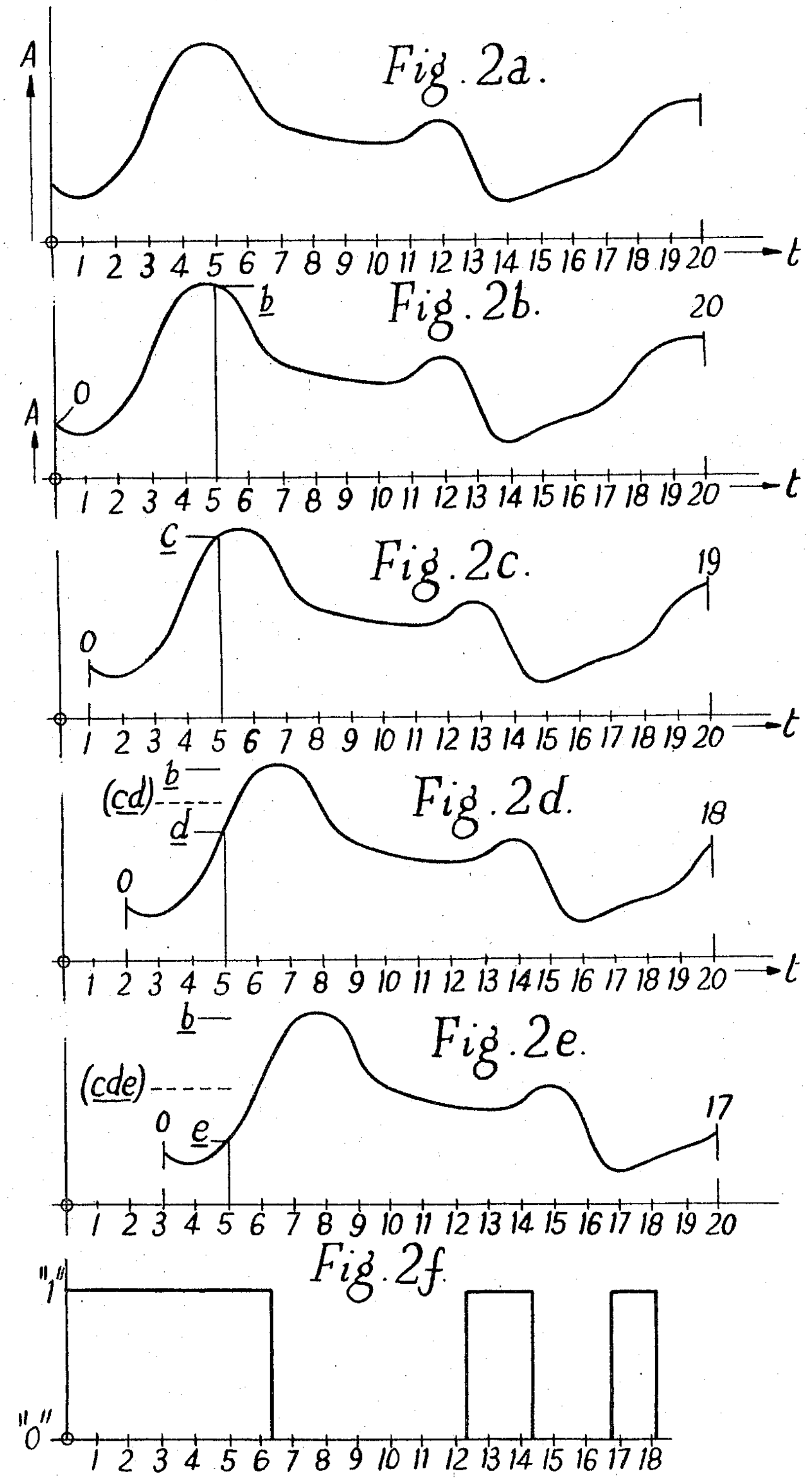

The picture signal provided by picture scanner 1, is represented diagrammatically in FIG. 2*a*, where the horizontal axis represents successive intervals of time of ⅙ microsecond increasing in the direction of the arrow *t* and the arrow A represents signal amplitude.

*Detail detector*

Figure 3:
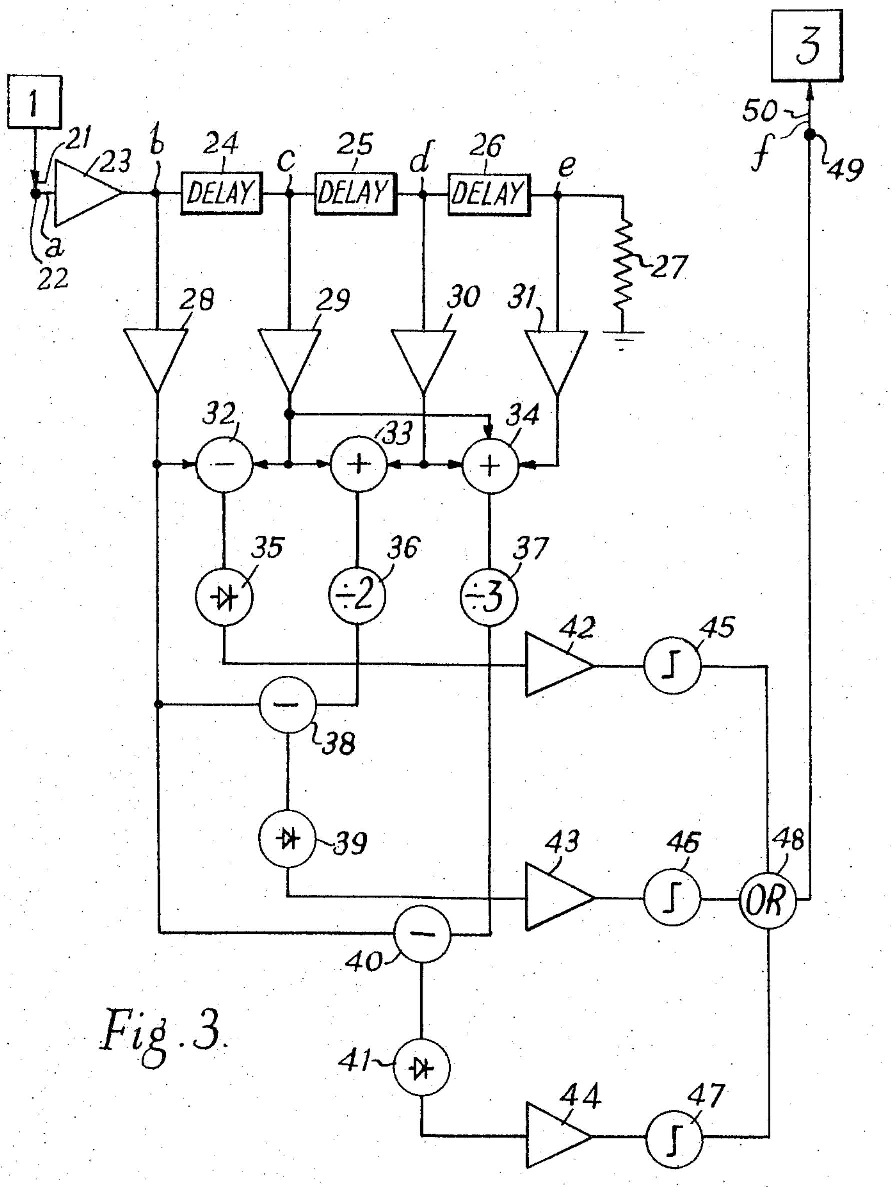
FIG. 3 is a block schematic diagram of the detail detector 2 of FIG. 1.

The detail detector 2 is represented in FIG. 3 and the waveforms appearing at points (*a*) to (*f*) in the circuit are shown respectively by FIGS. 2*a* to 2*f*.

The purpose of detail detector 2 is to evaluate as "high" or "low" the detail of the scanned picture by examination of the picture signal. This task is complicated by the fact that the picture signal is generated together with random "noise." A simple examination of the instantaneous frequency components of a picture signal mistakes noise for picture detail.

The detail detector of FIG. 3 distinguishes between true signal and random noise to the extent that it continuously compares the amplitudes of the picture signal at a number of points on the picture signal waveform which are spaced in time by constant intervals.

The picture signal of FIG. 2*a* derived from picture scanner 1, represented by box 1 in FIG. 3, is supplied by line 21 to the input terminal 22 of the detail detector and thence to an amplifier 23. Thus the signal at FIG. 3 point (*a*) is represented by FIG. 2*a*. The amplifier output signal at FIG. 3 point (*b*) has the same waveform as the input signal and, for this description, time delay in the amplifier 23 is ignored. The output signal at FIG. 3 point (*b*) is shown by FIG. 2*b*, wherein the increased amplitude of the signal is denoted by the reduced amplitude of the arrow A.

The picture signal waveform of FIG. 2*b* is fed to a tapped delay line, comprising three equal delay elements 24, 25 and 26, terminated in its characteristic impendance 27 to prevent signal reflection.

Each element 24, 25 and 26 provides a signal delay of ⅙ microsecond which, as explained above, is the Nyquist-Interval for a 3 mc./s. signal.

The picture signal waveform appearing at FIG. 3 point (*b*) is given by FIG. 2*b*, wherein time "0" is an arbitrary instant defining the start of the waveform shown and the marked points 1 to 20 are later instants in time spaced by intervals of ⅙ microsecond. Thus the point marked "20" on the waveform itself arrives 20 x ⅙ microsecond after the point marked "0" on the waveform.

If at $t=0$ the point "0" of the waveform appears at FIG. 3 point (*b*), then ⅙ microsecond later due to delay 24, waveform point "0" will appear at FIG. 3 point (*c*). The waveform appearing at FIG. 3 point (*c*) is thus shown in FIG. 2*c*, which figure shows the same signal waveform delayed by ⅙ microsecond.

After a further interval due to delay 25, the waveform point "0" appears at FIG. 3 point (*d*) and the same interval later, due to delay 26, the same waveform point "0" appears at FIG. 3 point (*e*). The signal waveforms at FIG. 3 point (*d*) and (*e*) are thus shown by FIGS. 2*d* and 2*e* respectively.

The signals appearing at the same time at FIG. 3 points (*b*), (*c*), (*d*) and (*e*) respectively are continuously fed to amplifiers 28, 29, 30 and 31.

The outputs of amplifiers 28 and 29 are continuously compared by a difference amplifier 32. Any difference signal is rectified by a rectifier 35, so that the polarity of the difference signal is ignored, and the rectified difference signal is supplied to an amplifier 42. The amplified difference signal is supplied to a threshold unit 45.

The threshold unit 45 is a Schmitt trigger circuit having a preset threshold level of operation. If the difference signal input exceeds this critical level, an output signal is supplied to one input of an OR gate 48.

At the same time, the average of signals at FIG. 3 points (*c*) and (*d*) is obtained by supplying the outputs of amplifiers 29 and 30 to a summing amplifier 38 and the summed output to a potential divider 36 of value ÷2.

The average of signals at (*c*) and (*d*) is compared with the signal at (*b*) by a difference amplifier 38. Any difference signal is rectified by a rectifier 39 and the output supplied, by way of amplifier 43, to a threshold unit 46.

The threshold unit 46 is similar to unit 46, except that the present threshold level may have a different value, and operates in similar manner. If the difference signal input exceeds the critical value, an output signal is supplied to the second input of the OR gate 48.

At the same time, the average of signals at FIG. 3 points (*c*), (*d*) and (*e*) is obtained by supplying the outputs of amplifiers 29, 30 and 31 to a summing amplifier 34 and the summed output to a potential divider 37 of value ÷3.

The average of signals at (*c*), (*d*) and (*e*) is compared with the signal at (*b*) by a difference amplifier 40. Any difference signal is rectified by rectifier 41 and the output supplied, by way of amplifier 44, to a threshold unit 47.

The threshold unit 47 is similar to the units 45 and 46. If the difference signal input exceeds the critical threshold value, an output is supplied to the third input of the OR gate 48.

If the OR gate 48 receives a signal input to any one of its three inputs an output signal is supplied to output terminal 49 and thence by line 50 to the sample-rate selector, represented by box 3.

Consider, by way of example, the instant of time represented by $t=5$ on the time scale of FIGS. 2*b* to 2*f*. The signal amplitudes appearing respectively at the delay line points (*b*), (*c*), (*d*) and (*e*) will be respectively the amplitudes values *b, c, d* and *e* of FIGS 2*b*, 2*c*, 2*d* and 2*e*.

Comparison of FIGS. 2*b* and 2*c* shows that there is no difference between the signal amplitude *b* and *c*. No signal output will be provided by the difference amplifier 32, therefore. The signal to the first input of OR gate 48 is zero.

Comparison of FIGS. 2*b* and 2*d* shows signal amplitude *d* to be smaller than amplitudes *b* and *c*. The average of amplitudes *c* and *d* is shown by the dotted line *cd*. The output from difference amplifier 33 is small, corresponding to the difference between *b* and *cd*. This, it will be supposed, is less than the threshold value of threshold unit 46. The signal to the second input of OR gate 48 is also zero, therefore.

Comparison of FIGS. 2*b* and 2*e* shows the signal amplitude *e* to be still lower than amplitude *c*. The average amplitudes *c, d* and *e* is shown by the dotted line *cde*. The output from difference amplifier 40 corresponds to the difference between *b* and *cde*. This, it will be supposed, is greater than the threshold value of threshold unit 47. The third input to OR gate 48 is energised, therefore, and a corresponding output signal appears at terminal 49.

The output from OR gate 48 has always one of two values, which may be represented as "1" and "0" according to whether any one of the three inputs is energised or whether all are not energised, respectively. The output at terminal 49, corresponding to the waveform of FIG. 2*a*, is shown in FIG. 2*f*.

Figure 4:
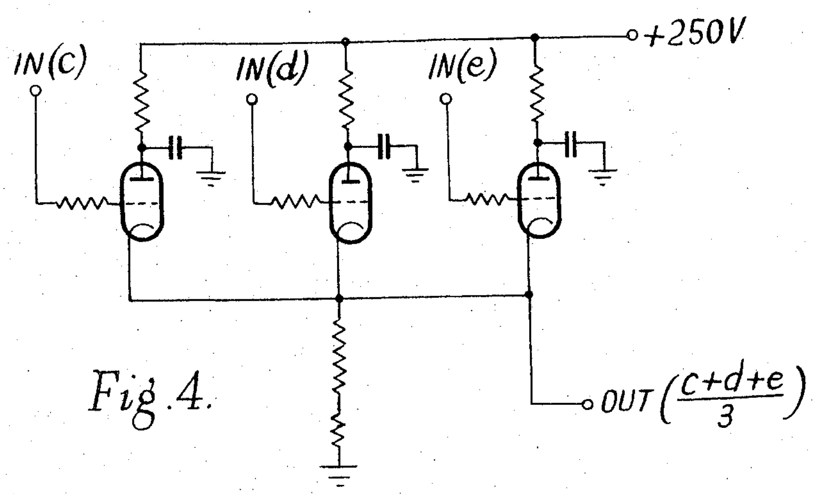
FIG. 4 is a circuit diagram of a summing amplifier used in the circuit of FIG. 3.

FIG. 4 shows a practical embodiment of signal averaging circuit comprising the summing amplifier 34 and the voltage divider 37.

The circuit for averaging the signal values *c* and *d*, comprising summing amplifier 33 and voltage divider 36, has only two amplifier stages with a common load tapped as a ÷2 voltage divider.

Figure 5:
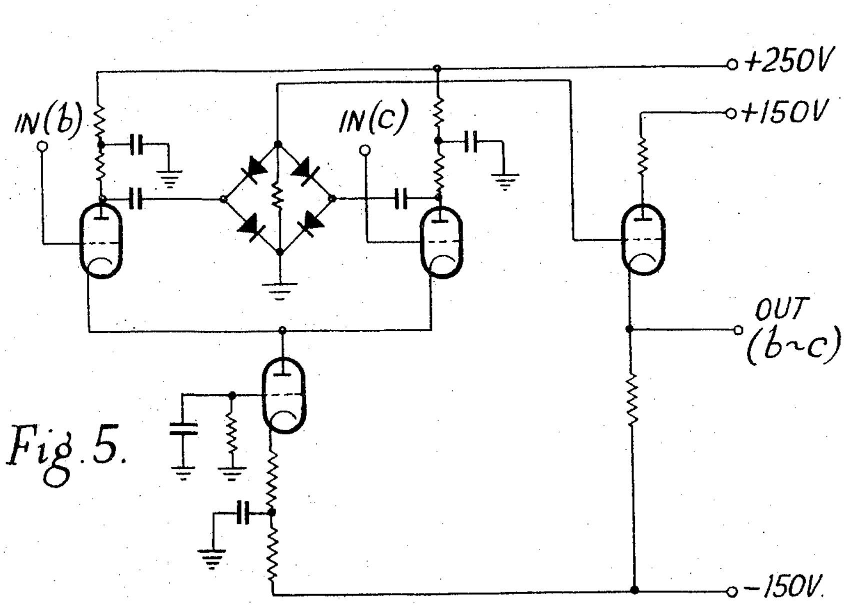
FIG. 5 is a circuit diagram of a difference amplifier and rectifier arrangement used in the circuit of FIG. 3.

FIG. 5 shows a difference amplifier and rectifier arrangement equally suitable for the amplifier-rectifier combinations 32, 25; 38, 39; and 40, 41.

The delay elements 24, 25 and 26 and amplifiers 23, 28 to 31 and 42 to 43 are all of known form. The threshold units 45 to 47 are known Schmitt trigger circuits adjusted to give a predetermined very small amount of backlash or hysteresis effect. The OR gate 48 is conveniently a mixing diode matrix, for example, of the form described by Millman and Taub, in "Pulse and Digital Circuits".

*Sample-rate selector*

The function of the sample rate selector 3 is to take the signal waveform of FIG. 2*f*, provided by the detail detector 2, and interpret this detail information to instruct sampling of the picture signal of FIG. 2*a* at one of the three chosen sampling intervals *t* (the Nyquist interval of ⅙ microsecond) 3*t* or 9*t*.

The sample-rate selector is arranged so that if the waveform of FIG. 2*f* were continuously of value "1", sampling at intervals *t* would be continuously instructed, whereas, if the waveform were continuously of value "0," sampling at intervals of 9*t* would be continuously instructed.

As neither of the values "1" or "0" can be steady state values during transmission of a picture, the sample-rate selector operates to evaluate the duration of each "0" gap between "1" blocks and to fill the "0" gap exactly with samples at intervals 9*t*, 3*t* or *t*, as necessary. A gap of duration less than 3*t* is filled by samples at intervals *t*. A gap of duration between 3*t* and 9*t* is filled by one or by two samples at interval 3*t* and the remaining part of the gap by samples at intervals *t*. A gap of duration greater than 9*t* is filled by the greatest possible number of samples at intervals 9*t*. The remaining part of the gap is filled by samples of interval 3*t* and *t*, as required. In this way picture sampling is limited to the three sample rates corresponding to the three intervals stated.

Figure 6:
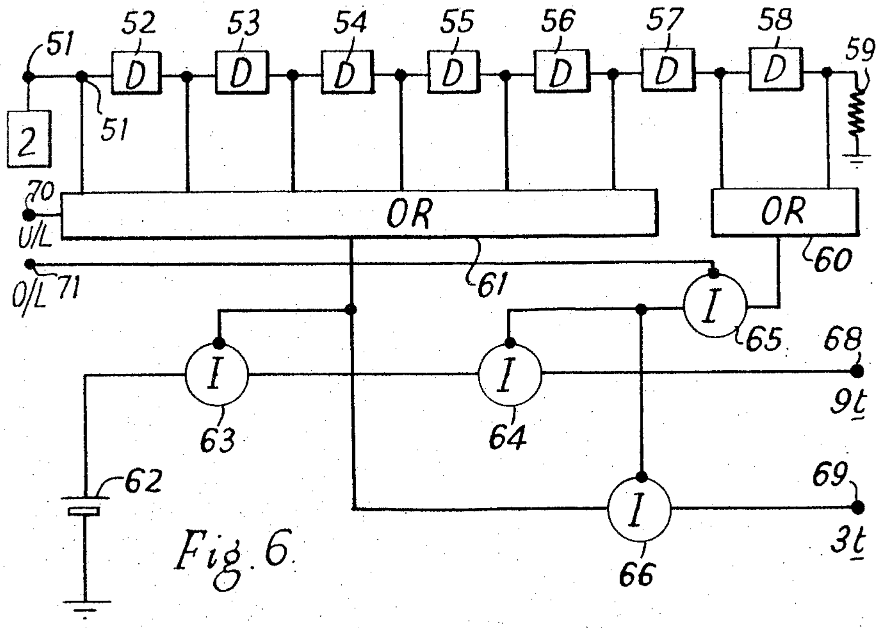
FIG. 6 is a block schematic diagram of the first part of the sample-rate selector 3 of FIG. 1.
Figure 7:
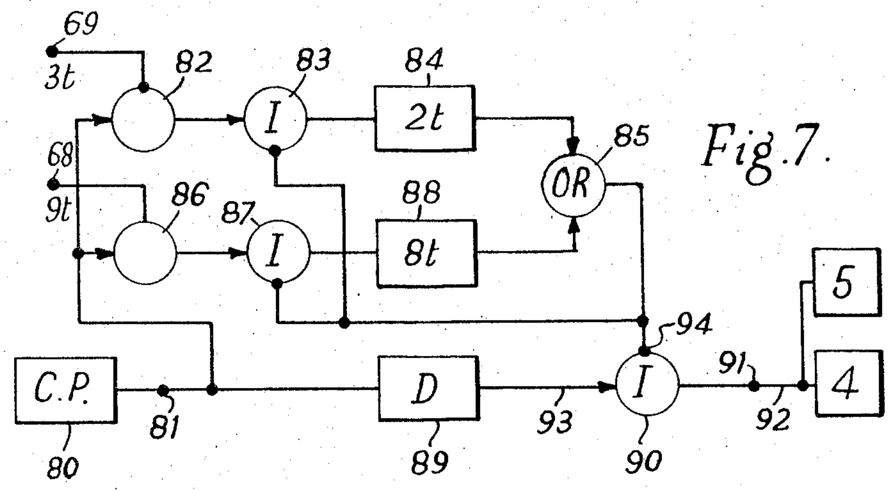
FIG. 7 is a similar diagram of the second part thereof.

The sample-rate selector 2 is shown in two parts in FIGS. 6 and 7, the output terminals 68, 69 of FIG. 6 appearing as input terminals in FIG. 7. It will be noted that the two terminals are inverted in FIG. 7, for convenience. The part of FIG. 6 operates as a translator of the signal of FIG. 2*f* and the part of FIG. 7 operates as a gating unit.

The output signal from the detail detector, represented by box 2 in FIG. 6, is fed by line 50 to input terminal 51 of the translator unit and thence to a tapped delay line, comprising seven equal delay elements 52 to 58 inclusive, terminated in its characteristic impedance 59. Each delay element 52 to 58 introduces an equal delay D of the Nyquist interval of ⅙ microsecond.

The output of the delay line 52–58 and the tap between elements 57, 58 are connected to the two inputs of an OR gate 60. The input terminal 51 and the taps between successive pairs of delay elements 52 to 57 are connected to the six inputs of an OR gate 61.

If an "0" level gap in the FIG. 2*f* waveform is equal to or greater than an interval 8*t*, the total delay of the delay line 51–58, no signal exists at any point in the delay line and neither OR gate 60, 61 has an output.

A signal from bias source 62 passes through inhibit gate 63 and inhibit gate 64 to terminal 68 to instruct sampling at the slow rate with interval 9*t*, as will be shown with reference to FIG. 7.

When a "1" level signal enters the delay line 52–58 at terminal 51, an output from OR gate 61, marks the inhibit terminal of inhibit gate 63 to de-energize 9*t* terminal 68. At the same time, the output from OR gate 61 passes inhibit gate 66 to energize terminal 69. This instructs sampling at the medium rate with interval 3*t*, as will be shown with reference to FIG. 7.

Unless a "0" level gap exceeds an interval 5*t*, one or more inputs to OR gate 61 are supplied with a signal, the 9*t* terminal 68 is de-energised and the 3*t* terminal 69 is energised. Thus, at the end of an interval equal to or less than 8*t* from the front of a "1" level signal entering the delay line, sampling at intervals 9*t* ceases and sampling at intervals 3*t* commences.

When a "1" level signal is at the input end or output end of delay element 58, OR gate 60 receives an input and supplies an output signal, through inhibit gate 65, to the inhibit terminals of both inhibit gates 64 and 68. Both terminals 68 and 69 are de-energised thereby. Sampling at both intervals 9*t* and 3*t* is inhibited in favour of sampling at interval *t*.

Underload and overload signal inputs are supplied to terminals 70 and 71 respectively. As previously explained, signal samples are stored and extracted from store at uniform intervals 3*t*. With sampling at intervals 3*t*, the store can neither fill nor empty. An underload signal originates when sampling occurs at intervals 9*t* for a prolonged period, so that the store empties.

An underload signal to terminal 70 is supplied to OR gate 61 to energise 3*t* terminal 69 and de-energise 9*t* terminal 68. Alternatively, sampling at interval *t* is permitted if an output from OR gate 60 de-energises 3*t* terminal 69.

An overload signal originates when sampling occurs at intervals *t* for a prolonged period. An overload signal to terminal 71 supplied to the inhibit terminal of inhibit gate 65 to inhibit the signal from OR gate 60 which would otherwise de-energise both terminals 68 and 69. The 3*t* terminal 69 or the 9*t* terminal 68 is then energised depending whether there is or is not an output signal from OR gate 61.

Considering now the gating unit of FIG. 7, pulses at interval *t* are supplied from a clock pulse generator 80 to terminal 81. If neither 3*t* terminal 69 nor 9*t* terminal 68 is energised, the clock pulses are supplied continuously through delay element 89, inhibit gate 90 and output terminal 91 by way of line 92 to the sampling and analogue-to-digital converter unit 4 and to the sample-rate coder unit 5, represented in FIG. 7 by the box 4 and the box 5, respectively.

Clock pulses are also supplied to gates 82 and 86, which gates are closed in the absence of a signal to the terminals 69 and 68 respectively. If 3*t* terminal 69 is energised, gate 82 is opened to pass clock pulses, by way of inhibit gate 83, to a monostable generator 84 which generates pulses of duration 2*t*. These 2*t* pulses are supplied by way of OR gate 85 to the inhibit terminal of inhibit gate 90 and serve to block out two clock pulses in each sequence of three. The output at terminal 91 are the residual clock pulses at interval 3*t*.

If 9*t* terminal 68 is energised, gate 86 is opened to supply clock pulses by way of inhibit gate 87 to a monostable generator 88 which generates pulses of duration 8*t*. These 8*t* pulses are supplied by way of OR gate 85 to the inhibit terminal of inhibit gate 90 and serve to block out eight clock pulses in each sequence of nine. The output at terminal 91 are the residual clock pulses at interval 9*t*.

Either pulse of duration 2*t* or 8*t* from generator 84 or 88 respectively inhibits both inhibit gates 83 and 87 for the duration of the respective pulse. This prevents either generator 84 or 88 being triggered by an incoming clock pulse while an output pulse is being generated.

The delay 89 corresponds to one half the clock pulse interval, that is ½*t*. This ensures that the 2*t* and 8*t* inhibit pulses overlap the two or eight clock pulses to be blocked out.

Figure 8:
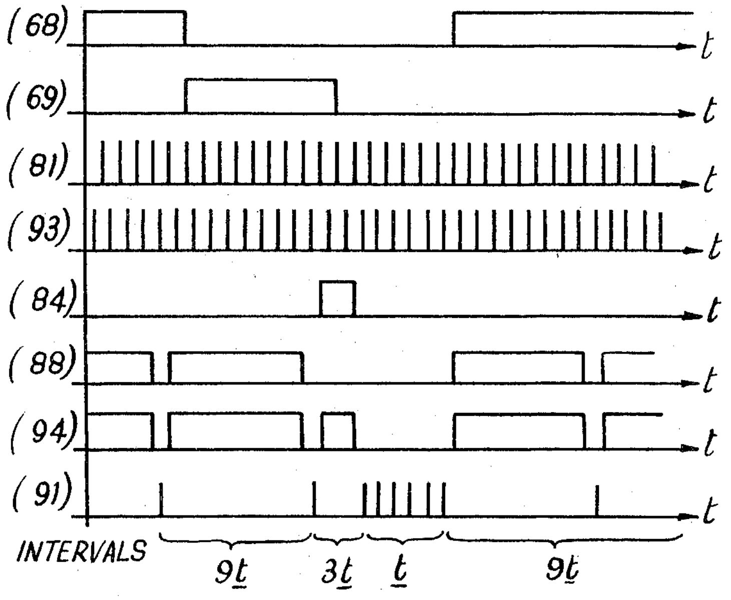
FIG. 8 shows a series of pulse-time diagrams representing the signals at various points of the circuit of FIGS. 6 and 7.

FIG. 8 is a signal/time diagram showing typical signals at various points of the gating circuit of FIG. 7. The numeral references in brackets at the lefthand side of each waveform correspond to the terminal or element references in FIG. 7 at which the waveform appears. For the purpose of FIG. 8, the input line of inhibit gate 90 is referenced 93 and the inhibit terminal 94.

*Signal sampler and analogue-to-digital converter*

This unit may be considered in its two parts according to its two functions, the first of sampling the amplitude of the picture signal and the second of converting the amplitude value to a digital number.

The signal sampler has the picture signal waveform of FIG. 2*a* supplied continuously to one input terminal and the pulse, waveform of FIG. 8, 91 supplied to the other input terminal. For each pulse of the latter waveform this unit evaluates the instantaneous amplitude of the FIG. 2a waveform.

The apparatus required for this purpose is known and may, for example, comprise apparatus as described by Chance et al. in "Waveforms" and by Millman and Taub in "Pulse and Digital Circuits."

The instantaneous amplitude is evaluated as a seven-bit binary number and the output number is supplied in parallel at seven output terminals.

The apparatus used may comprise a coding tube such as that described by Sears in Bell System Technical Journal, January 1948, page 44, or any other suitable analogue-to-digital converter.

*Sample-rate coder*

The sample-rate coder operates to ascertain the sample-rate according to the pulse waveform of FIG. 8 (91). This can be only the high, medium or low rate corresponding to the pulse intervals $t$, $2t$ and $9t$ respectively. The three possibilities are coded as a two-bit binary number on two parallel channels.

Figure 9:
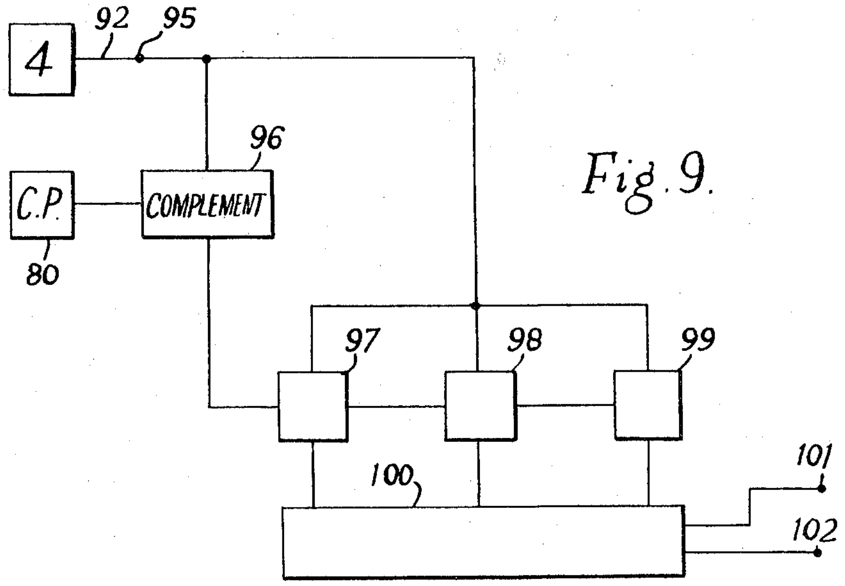
FIG. 9 is a block schematic diagram of the sample-rate coder 5 of FIG. 1.

The sample-rate coder is shown more fully in FIG. 9. The pulse waveform of FIG. 8 (91) on line 92 is supplied to input terminal 95 and thence to a complement unit 96 and a counter of three binary stages 97, 98 and 99. The complement unit is also supplied with clock pulses from the clock pulse generator 80, so that it generates the complement of the input waveform of FIG. 8 (91). In other words, the complement unit 96 fills in the intervals between sample pulses with clock pulses. According to sample-rate, the intervals may contain eight, two or zero clock pulses. These pulses are fed to the counter 97, 98, 99 which counts the input pulses in sequence, being reset by each sample pulse at terminal 95. The state of counter 97, 98, 99 at each reset operation is detected by converter 100 which supplies the corresponding one of three two-bit binary numbers at terminals 101 and 102.

*Picture-sample store*

The digital number representing picture-sample amplitude is a seven-bit binary number supplied at seven parallel output terminals of unit 4.

The picture-sample store correspondingly comprises seven channels and has, in this particular example, 150 stages. Picture samples are "stacked" in the store at the sample-rate determined by unit 3 and withdrawn at uniform extraction intervals $3t$.

In this embodiment of the store, samples are always extracted from the end stage. Thus the logic of the store circuitry is required to shift forward the sample contents of the store at each extraction operation and enter each new sample into the first available empty stage at each sample operation.

The store 6, switch 7 and store 8 of FIG. 1 are shown more fully in FIG. 10. The seven-bit sample from unit 4 is supplied to seven terminals 103 to 109. For simplicity of the figure, only the two channels from terminals 103 and 109 are shown and only the first stage and the final three stages are shown.

Each parallel line 103 to 109 extends through the store and is connected to all 150 stages of the corresponding channel.

The store content unit 8 comprises a single channel only, as it stores binary information, the single channel being supplied with the pulses of FIG. 8 (91) at terminal 110 by way of delay 111.

Shift of the samples through the store, stage by stage, and extraction of the sample in the end stage are performed simultaneously by shift pulses at interval $3t$ supplied at terminal 113. These are derived from the clock pulse generator 80 by way of a ÷3 divider 112. Switching of the sample input to the correct stage of store 6 is controlled by unit 8.

The unit 8 comprises an input line 114 from delay 111 which runs to all 150 stages of the unit. Each stage contains an AND gate A, a binary store B and an inhibit gate I suffixed in FIG. 10 according to the number of the stage counting from the end of the unit.

For the purpose of describing FIG. 10 it is assumed that store B.1. is in state "1," that is full, while stores B.2. to B.150 are in state "0," that is empty. This stage provides an output from inhibit gate I.2., which prepares the AND gate A.2. of unit 8 and similarly the seven AND gates A.1.2. to A.1.7. of store 6. The next incoming picture sample is therefore entered into the binary storage elements B.2.1 to B.2.7. of store 6.

Solely the AND gates of stage 2 have been prepared, so that the same picture sample, although appearing at the input terminals of all other stages, is entered solely into stage 2.

Immediately after entry of the sample into store, a delayed pulse from store B.2. flows through inhibit gate I.3. to prepare AND gate A.3. and similarly AND gates A.3.1. to A.3.7. of store 6. The next picture sample is then entered into stores B.3.1. to B.3.7. In the same way, the next following sample is entered into stores B.4.1. to B.4.7.

The foregoing description has assumed picture sampling at intervals $t$, so that three samples are stored for the extraction of one sample. The next operation, therefore, is the extraction of a sample from store 6.

A shift pulse at terminal 113 shifts the number stored in each of stages 3 and 2 into the next lower numbered stage. Thus the stage of store element B.3.1. is transferred to store element B.2.1. while the state of B.2.1. is transferred to store element B.1.1. The stage of B.1.1. is emitted as a signal of level "1" or level "0" corresponding. Thus the sample in store elements B.1.1. to B.1.7. is emitted as a seven-bit binary number identical to the form in which it was entered. This output sample appears at terminals 121 to 127.

At the bottom of FIG. 10 is shown a box 9 which represents the sample-rate store 9 of FIG. 1. This store is identical in form to picture-sample store 6, except that it holds only a two-bit number and therefore has two channels instead of seven. It similarly has 150 stages.

The two AND gates of stage 1 have inputs in parallel with AND gates A.1. and A.1.1. to A.1.7., so that they are prepared coincidently therewith, and similarly for stages 2 *to* 150. Shift pulses from terminal 113 are similarly supplied to all the binary storage elements of store 9. Sample-rate code numbers are entered into store 9 and extracted therefrom coincidently with the corresponding picture samples from store 6.

Store 9 of FIG. 10 is thus shown with two input terminals 131 and 132, which are supplied from sample rate coder 5, and two output terminals 133 and 134, which supply converter 13.

*Digital-to-analogue converter*

The digital-to-analogue converters 12 and 13 are of known form, such as that described by Sears in Bell System Technical Journal, January 1948, page 44. Converter 12 has seven input terminals to which the seven-bit picture sample is supplied in parallel when extracted from the last stage of the picture-sample store 6. This converter supplies a voltage output signal having one of 128 discrete amplitudes, corresponding to the magnitude of the seven-bit sample number. This output signal occurs as a pulse at the extraction interval of $3t$. This pulse signal is fed through a low-pass filter, not shown, to the video line of channel 14.

Digital-to-analogue converter 13 correspondingly has two input terminals and provides an output signal having one of three discrete amplitude levels, according to the sample rate. This signal is similarly a pulse signal at the extraction interval $3t$.

For simplicity in the present explanation, it will be assumed that this pulse signal is similarly fed by way of a low-pass filter, not shown, to the "position" line of channel 14. In practice, the signal is preferably recorded to occupy a bandwidth corresponding to its small information content.

*Receiver*

The receiver 15 has picture tube supply and scanning circuits, in known manner. It has two inputs to which the video and "position" signals are supplied, respectively. The video signal is amplified and supplied to the control electrode of the picture tube in conventional manner. The position signal controls the line scan circuits so that the high sample-rate signal reduces the line scan speed to one-third that for the medium scan rate. The low sample-rate signal increases the line scan to three times that for the medium scan rate. The resultant effect is to compensate by a variable scanning rate for the fact that picture samples taken non-uniformly in time are transmitted uniformly in time. In this way, the original picture is reproduced on the receiver picture tube.

A suitable circuit arrangement for the purpose described above is that described in British Patent No. 858,346, with reference to FIG. 3 of the complete specification thereof.

What we claim is:

1. A television system having a transmitter and a receiver connected by a transmission channel of insufficient bandwith to accommodate the bandwidth of high-detail signals, the transmitter having a scanner for translating a television picture into a corresponding picture signal, a detail detector unit for estimating the detail content of the picture signal continuously according to one of a plurality of discrete picture detail levels and for providing a corresponding picture detail level signal, an analogue-to-digital converter supplied with the picture signal and controlled by the picture detail level signal to provide digital evaluation of picture signal amplitude at discrete sampling instants, the sampling instants being spaced by a chosen one of a plurality of predetermined sampling intervals defining a plurality of different signal sampling rates, the choice of sampling rate being determined by the picture detail level signal, a first multiple-stage store for storing the digital samples of picture signal amplitude, means for extracting from the first store said digital samples at a predetermined extraction rate, means for supplying said samples to said transmission channel, a storage content unit for continuously examining the number of the digital samples contained in said first store and providing an overload and an underload signal respectively as the first store becomes full or becomes empty, said overload and underload signals being effective to override said choice of signal sampling rate and to choose a signal sampling rate less than the sample extraction rate in the case of the overload signal and a signal sampling rate greater than the sample extraction rate in the case of the underload signal, a sample-rate coder for providing digital numbers defining the interval between successive picture signal samples, a second multiple stage store for storing the sample-rate numbers, means for extracting from the second store said sample-rate numbers at the said predetermined extraction rate and coincidently with one of the two picture signal samples to which it relates samples and a scanning position signal derived from said transmission channel, said receiver being supplied both with a picture signal derived from said picture signal samples and a scanning position signal derived from said sample-rate numbers.

2. A television system as claimed in claim 1, in which the detail detector unit includes a tapped delay line having an input terminal supplied with the picture signal, an output terminal and at least first and second intermediate taps, difference amplifier means for simultaneously comparing the amplitude of the signal supplied to the input terminal with the signal appearing at the first tap, the average amplitude of the signals appearing at the first and second taps and the average amplitude of the signals appearing at the first and second taps and the output terminal, and for supplying three difference signals correspondingly one to each of three threshold units adapted to supply an output signal only when the input difference signal exceeds a predetermined amplitude and an OR unit having three input terminals supplied from one threshold unit and having an output terminal providing an output signal when any one of the input terminals receives a signal.

3. A television system as claimed in claim 2, in which the input terminal of the delay line and the first and second taps and output terminal thereof are separated from one another by equal delay intervals corresponding to the Nyquist interval for the bandwidth of the picture signal.

4. A television system as claimed in claim 3, in which output signals from the detail detector unit are supplied to a sample rate selector for controlling the sampling of the picture signal at intervals of $t$, $3t$ and $9t$ selectively, according to the detail detector unit output signals, where $t$ is the Nyquist interval for the bandwidth of the picture signal.

5. A television system as claimed in claim 4, in which the sample rate selector comprises a delay line having an input terminal, supplied with the detail detector unit output signal, an output terminal and six intermediate taps all spaced from one another by delay elements providing equal intervals $t$ and a first OR gate having two input terminals connected one to the delay line output terminal and the other to the last of said six intermediate taps, said first OR gate supplying an output signal for controlling sampling of the picture signal at intervals $t$ when either input terminal is supplied with a delayed signal from said detail detector unit.

6. A television system as claimed in claim 5, in which said sample rate selector comprises a second OR gate having six input terminals supplied respectively from the delay line input terminal and the first five of said six intermediate taps and an output terminal supplying an output signal when any one of said input terminals is supplied with a signal from said detail detector unit and inhibit gate means arranged to control picture signal sampling at rate $9t$ when neither first nor second OR gate provides an output signal.

7. A television system as claimed in claim 6, in which said inhibit gate means is further arranged to control picture signal sampling at rate $9t$ when the second OR gate provides an output signal and the first OR gate does not provide an output signal.

8. A television system as claimed in claim 7, in which a signal source is connected to a $9t$ sample rate signal output terminal by way of two inhibit gates serially arranged and inhibited respectively by output signals from the first and second OR gates and the second OR gate output is connected to a $3t$ sample rate signal output terminal by way of an inhibit gate inhibited by output signals from the first OR gate.

9. A television system as claimed in claim 8, in which the sample rate selector has input terminals for said store overload and underload signals, said underload signal being supplied as an input signal of said second OR gate at a seventh input terminal thereof and said overload signal being supplied to inhibit the supply of output signals from the first OR gate to the respective one of said serially arranged inhibit gates.

10. A television system as claimed in claim 9, in which signals controlling each picture signal sample are generated by a clock pulse generator providing pulses at intervals $t$ said pulses being inhibited by a gating unit according to the presence of signals at one or other of said $9t$ sample rate signal and $3t$ sample rate signal output terminals.

11. A television system as claimed in claim 10, in which said gating unit supplies clock pulses by way of a delay unit and a first inhibit gate to an output terminal and also to second and third inhibit gates by way of fourth and fifth gates respectively enabled by $3t$ and $9t$ sampling rate singals respectively said second and third inhibit gates supplying input terminals of an OR gate respectively by way of delay elements of $2t$ and $8t$ and said OR gate supplying an output signal to inhibit all of said first second and third inhibit gates.

12. A signal transmission system having a transmission channel, a source of an information signal, a detail detector unit for estimating the detail content of the information signal continuously and for providing a corresponding detail level signal, a sampling unit supplied with the information signal and controlled by the detail level signal to provide evaluation of the information signal amplitude at discrete sampling instants, the interval between any two consecutive sampling instants being chosen from a plurality of predetermined sampling intervals defining a plurality of different information signal sampling rates, the choice of the sampling rate being determined by the detail level signal, a first multi-stage store for storing information about the samples of the information signal amplitude, means for extracting from the first store said information about said samples at a first extraction rate, means for suppyling said information about said samples, extracted from the first store, to said transmissian channel, a second multiple stage store for storing information about the sample supply rate defining the intervals between successive samples of the information signal, means for extracting from the second store the information stored therein at a second extraction rate, means for supplying the information extracted from the second store to the transmission channel, means at the output of the transmission channel for respacing the information signal samples according to the sample supply rate information, and a storage content unit for continuously examining the number of samples contained in the first store and providing an overload and an underload signal, respectively, as the first store becomes full or becomes empty, said overload and underload signal being effective to over-ride the choice of signal sampling rate, and to choose a signal sampling rate less than or equal to the sample extraction rate in the case of the overload signal and a signal sampling rate greater than or equal to the sample extraction rate in the case of the underload signal.

13. A system according to claim 12 wherein the second extraction rate is equal to the first extraction rate.

14. A system according to claim 12, wherein the sampling unit comprises an analogue to digital converter supplied with the information and controlled by the detail level signal to provide digital evaluation of the information signal amplitude at the discrete sampling instants, so that the samples are stored in the first store in digital form and are supplied to the transmission channel in the digital form; a sample rate coder being provided in the system for supplying the sample supply rate information in digital form for storing in the second store, so that the sample supply rate information is supplied to the transmission channel in the digital form.

15. A television transmission system comprising a signal transmission system according to claim 12, wherein the television system comprises a transmitter and a receiver, the transmitter having a scanner for translating a television picture into the corresponding information signal, and the sample supply rate information being in the form of a scanning position signal.

16. A system according to claim 12, wherein the sampling unit comprises an analogue to digital converter supplied with the information and controlled by the detail level signal to provide digital evaluation of the information signal amplitude at the discrete sampling instants, so that the samples are stored in the first store in digital form and are supplied to the transmission channel in the analogue form; a sample rate coder being provided in the system for supplying the sample supply rate information in digital form for storing in the second store, so that the sample supply rate information is supplied to the transmission channel in the analogue form.

References Cited by the Examiner

UNITED STATES PATENTS 3,006,991 10/1961 Cherry et al. ------ 179—15.55

DAVID G. REDINBAUGH, *Primary Examiner.*

J. A. ORSINO, *Assistant Examiner.*